United States Patent Office 3,470,168
Patented Sept. 30, 1969

3,470,168
2-SUBSTITUTED-4H-1,3-BENZOTHIAZIN-4-ONE DERIVATIVES
Milton Wolf, West Chester, and John H. Sellstedt, St. Davids, Pa., assignors to American Home Products Corporation, New York, N.Y., a corporation of Delaware
No Drawing. Filed Mar. 31, 1967, Ser. No. 627,296
Int. Cl. C07d 93/08, 99/06; A61k 27/00
U.S. Cl. 260—243          30 Claims

ABSTRACT OF THE DISCLOSURE

This invention is concerned with 2-substituted-4H-1,3-benzothiazin-4-ones which have demonstrated pharmacological activity as anti-inflammatory, central nervous system depressant, analgesic and diuretic agents.

---

This invention relates to new and novel benzothiazinones. In particular, it is concerned with 2-substituted-4H-1,3-benzothiazin-4-ones which are therapeutically efficacious as medicinal agents.

The benzothiazinone compounds which are within the scope of the present invention are depicted by the following formula:

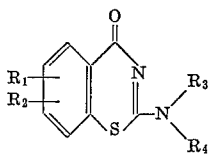

wherein $R_1$ is selected from the group consisting of hydrogen, lower alkyl, lower alkoxy, phenyl, lower alkoxyphenyl, benzyl, pyridyl, trifluoromethyl, halogen, nitro, amino, di(lower)alkylamino, carbamoyl, sulfamoyl, lower alkoxycarbonyl, lower alkylthio and carboxy(lower)alkyl; $R_2$ is selected from the group consisting of hydrogen, lower alkyl, lower alkoxy and halogen; $R_3$ is selected from the group consisting of hydrogen, lower alkyl, hydroxy(lower)alkyl, phenyl, lower alkylphenyl, halophenyl, carboxy(lower)alkyl, and lower alkoxycarbonylmethyl; $R_4$ is selected from the group consisting of hydrogen and lower alkyl with the proviso that when $R_4$ is hydrogen $R_3$ is other than hydrogen; and when $R_3$ and $R_4$ are taken together with the nitrogen atom to which they are attached they form a ring selected from the group consisting of morpholino; piperidino, pyrrolidino, 4-(lower)alkylpiperazino, 4-(lower)alkoxyphenyl-1-piperazino, hexahydroazepinylamino and pyridyl(lower)alkyl. Typical examples of these compounds are: 2-dimethylamino - 4H-1,3-benzothiazin-4-one; 2-(1-piperidino) - 4H-1,3-benzothiazin-4-one; 2-(4-methyl-1-piperazinyl) - 4H-1,3-benzothiazin-4-one and 6-chloro-2-(N-methylanilino-4H-1,3-benzothiazin-4-one.

The benzothiazinone compounds of the present invention may be prepared by the process as hereinafter schematically depicted:

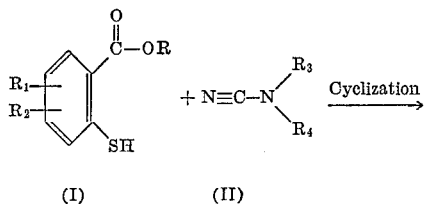

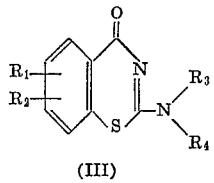

wherein $R_1$, $R_2$, $R_3$ and $R_4$ are defined as above and R is hydrogen or lower alkyl. The cyclization reaction is effected by admixing approximately equimolar amounts of a 2-mercaptobenzoic acid or ester (I) and an appropriate cyanamide (II), in the presence of a catalyst, such as p-toluenesulfonic acid, monohydrate or sodium ethoxide, with stirring, under an inert atmosphere, at a temperature range from about 50° C. to about 200° C. for a period of about one-half hour to about five hours. Preferably this reaction is conducted with either p-toluenesulfonic acid or sodium ethoxide, under nitrogen, at a temperature of about 175° C. for a period of about two and a half hours.

When the above cyclization reaction is complete, the product (III) is separated by standard recovery procedures. For example, when the product precipitates from the reaction mixture as a solid, it may be separated therefrom by decantation or filtration. Alternatively, when the product remains dissolved in the reaction mixture, the unreacted starting materials may be removed under vacuum. Thereafter, the residue is dissolved in an organic solvent, e.g. methylene chloride, extracted with a mineral acid, such as hydrochloric acid, basified e.g. ammonium hydroxide, and the combined organic extracts distilled to afford an oil which crystallizes on cooling to yield the product (III). The 2-substituted-4H-1,3-benzothiazin-4-one (III) which is obtained by either of the aforesaid recovery procedures may then be recrystallized from a suitable organic solvent.

The new and novel benzothiazinone compounds of the present invention may also be synthesized by the process which is exemplified by the following reaction scheme:

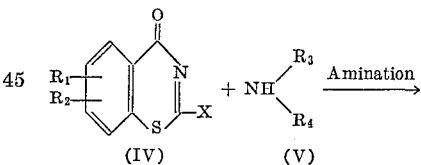

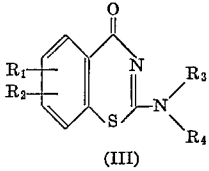

wherein $R_1$, $R_2$, $R_3$ and $R_4$ are defined as above, and X is a halogen. The amination reaction is effected by admixing a 2-halo-4H-1,3-benzothiazin-4-one (IV) with an appropriate amine (V) in a reaction-inert organic solvent at about reflux temperatures for a period of about one-half hour to about four hours. Preferably, this reaction is conducted in anhydrous benzene at reflux temperatures for about one-half hour.

When the aforesaid amination reaction is complete, the 2-substituted-4H-1,3-benzothiazin-4-one (III) is obtained by conventional recovery procedures, e.g. trituration with ethyl acetate, filtration and recrystallization from a suitable organic solvent.

Some of the new and novel benzothiazinone compounds of this invention, in particular the 2-dimethylamino-4H-1,3-benzothiazin-4-ones, may be prepared by the process which is structurally illustrated as follows:

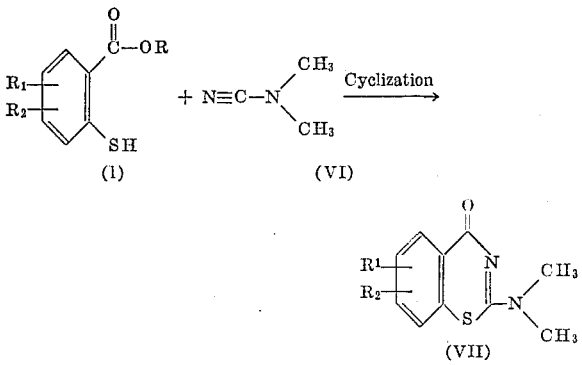

wherein $R_1$ and $R_2$ are defined as above. The cyclization reaction is effected by admixing approximately equimolar amounts of a 2-mercaptobenzoic acid (I) with dimethylcyanamide (VI) in a reaction-inert organic solvent at reflux temperatures for a period from about four hours to about thirty hours. Preferably, this reaction is conducted in tetrahydrofuran, in the presence of an antioxidant e.g. hydroquinone at the reflux temperature of the reaction mixture for about twenty-four hours.

When the above cyclization reaction is complete, the resulting 2-dimethylamino - 4H - 1,3 - benzothiazin-4-one (VII) is recovered by the customary isolation procedures, e.g. filtration and recrystallization from a suitable organic solvent.

Many of the reactants employed in the processes of this invention, in particular, the 2-mercaptobenzoic acids (I), the cyanamides (II) and (VI) and the amines (V) are known compounds which are readily available from commercial sources. Others which are not commercially available can easily be prepared in accordance with standard oragnic procedures well known to those skilled in the art. The 2-halo-4H-1,3-benzothiazin - 4 - one (IV) reactants utilized in the second above described process are prepared by the procedure described by G. Simchen, Angew. Chem., 78, p. 674 (1966). The term "reaction-inert organic solvent" as employed in both the second and third above described processes is defined to mean an organic solvent which dissolves the reactants and will not prevent or interfere with their interaction, for example, benzene, tetrahydrofuran, xylene, toluene, dioxan, dimethylacetamide and dimethylformamide. By the term "suitable organic solvent" as employed in the three aforesaid processes is meant an organic solvent which can be employed to recrystallize the benzothiazinones of the present invention, examples thereof are: tetrahydrofuran, ether, benzene, ethanol, ethyl acetate, benzene-cyclohexane mixtures, benzene-ethyl acetate mixtures, and ethyl acetate-hexane mixtures.

In accord with the present invention, the new and novel 2-substituted-4H-1,3-benzothiazin - 4 - one compounds of this invention have been found to possess interesting pharmaceutical properties which render them useful as synthetic medicinals. More particularly, these compounds, in standard pharmacological tests, have exhibited utility as anti-inflammatory, central nervous system depressant, analgesic and diuretic agents.

When the compounds of this invention are employed for the purposes as described above, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required ot produce the same effect as a smaller quantity given parenterally. In general, the compounds of this invention are most desirably administered at a concentration level that will generally afford effective results without causing any harmful or deleterious side effects and preferably at a level that is in the range of from about 1.5 mg. to about 15 mg. per kg. of body weight per day, although as aforementioned variations will occur. However, a dosage level that is in the range of from about 2 mg. to about 8 mg. per kg. of body weight per day is most desirably employed in order to achieve effective results.

The following examples are given by way of illustration and are not to be construed as limitations of this invention, many variations of which are possible without departing from the scope and spirit thereof.

EXAMPLE I

A solution of 2-mercaptobenzoic acid (15.4 g., 0.10 m.) and dimethylcyanamide (7.01 g., 0.10 m.) in tetrahydrofuran (100 ml.), to which a few crystals of hydroquinone have been added, is refluxed for twenty-four hours. On cooling and scratching, a colorless solid separates (6.6 g., 30.6 percent), M.P. 160–162° C. (uncorr.). The crude product is recrystallized from tetrahydrofuran affording colorless prisms of 2-dimethylamino-4H-1,3-benzothiazin-4-one (5.0 g., 24.0 percent), M.P. 164–165.5° C.

*Analysis.*—Calcd. for $C_{10}H_{10}N_2OS$: C, 58.23; H, 4.88; N, 13.58. Found: C, 58.34; H, 4.78; N, 13.61.

In a similar manner, 2-mercapto-4-methylbenzoic acid is reacted with dimethylcyanamide to afford 2-dimethylamino-7-methyl-4H-1,3-benzothiazin-4-one.

EXAMPLE II

A mixture of methyl 2-mercaptobenzoate (16.8 g., 0.1 m.), diethylcyanamide (10.8 g., 0.11 m.) and p-toluenesulfonic acid monohydrate (0.4 g.) is heated with stirring in a nitrogen stream to 175° C. over a period of two and one-half hours. Vacuum is applied to remove unreacted materials and the residue dissolved in methylene chloride, extracted with concentrated hydrochloric acid (2× 100 ml.). The combined acidic extracts are washed with methylene chloride, then cooled in an ice bath, and basified with concentrated ammonium hydroxide in the presence of methylene chloride (200 ml.). The organic layer is separated, and the aqueous layer extracted with methylene chloride (150 ml.), the combined organic layers are washed with saturated sodium chloride solution (150 ml.) and filtered through anhydrous sodium sulfate. The solvent in distilled in vacuo affording a pale orange oil (19.2 g.) which crystallizes on cooling and scratching; straw-colored crystals (19.2 g., 82.1 percent), M.P. 51–56° C. (uncorr.). The crude product is recrystallized from ether to afford colorless crystals of 2-diethylamino-4H-1,3-benzothiazin-4-one (14.0 g., 59.8 percent), M.P. 59–61° C. (uncorr.).

*Analysis.*—Calcd. for $C_{12}H_{14}N_2OS$: C, 61.51; H, 6.02; N, 11.95. Found: C, 61.43; H, 5.77; N, 11.90.

Similarly, 2-diethylamino-6,7-diethoxy-4H-1,3-benzothiazin-4-one and 7-carbamoyl-2-methylamino-4H-1,3-benzothiazin-4-one are prepared.

EXAMPLE III

Methyl 2-mercaptobenzoate (12.2 g., 0.0725 m.) is reacted with diisopropylcyanamide (10.0 g., 0.080 m.) and p-toluenesulfonic acid monohydrate (0.3 g.) in a manner similar to that of Example II. The crude product (5.9 g.), M.P. 62–75° C., is recrystallized from benzene and the solid which separates (M.P. 138–151° C.) is discarded. The solid derived from the filtrate is recrystallized twice from ether affording colorless crystals of 2-diisopropylamino-4H-1,3-benzothiazin-4-one, M.P. 118–120° C. (uncorr.).

*Analysis.*—Calcd. for $C_{14}H_{18}N_2OS$: C, 64.09; H, 6.92; N, 10.68. Found: C, 64.24; H, 7.10; N, 10.87.

Similarly, methyl 2-mercaptobenzoate (16.8 g., 0.10 m.) is reacted with N-cyanopiperidine (12.1 g., 0.11 m.) and p-toluenesulfonic acid monohydrate (0.4 g.). The crude product (17.0 g.), M.P. 157–160° C. (uncorr.), is recrystallized from benzene affording colorless crystals of 2-(1-piperidino)-4H-1,3-benzothiazin-4-one (13.5 g., 54.9 percent), M.P. 159–161° C. (uncorr.).

*Analysis.*—Calcd. for $C_{13}H_{14}N_2OS$: C, 63.39; H, 5.73; N, 11.37. Found: C, 63.61; H, 5.81; N, 11.34.

EXAMPLE IV

A mixture of methyl 4-chloro-2-mercaptobenzoate (12.1 g., 0.06 mole), N-cyanomorpholine (7.75 g., 0.069 mole), and p-toluenesulfonic acid monohydrate (0.2 g.) is stirred under a slow stream of nitrogen while increasing its temperature from 100° C. to 150° C. over one-half hour. The temperature is then kept at 150° C. for two and a half hours, and then brought to room temperature. The brown residue is triturated with ethyl acetate and filtered, giving a light brown solid (10.0 g., 59 percent), M.P. 231–233° C. (uncorr.). The solid is recrystallized from ethanol, giving white crystals of 7-chloro-2-morpholino-4H-1,3-benzothiazin-4-one, M.P. 230–231° C. (uncorr.).

*Analysis.*—Calcd. for $C_{12}H_{11}ClN_2O_2S$: C, 50.97; H, 3.92; N, 9.91. Found: C, 51.26; H, 3.75; N, 9.80.

In the same manner, 6,7-dichloro-2-morpholino-4H-1,3-benzothiazin-4-one; 6,7-dibromo-2-morpholino-4H-1,3-benzothiazin-4-one and 5-methylthio-2-morpholino-4H-1,3-benzothiazin-4-one are obtained.

EXAMPLE V

A solution of methyl 2-pyridylmethylamine (7.35 g., 0.06 mole) in anhydrous benzene (25 ml.), is added to a boiling mixture of 2,6-dichloro-4H-1,3-benzothiazin-4-one (6.97 g., 0.03 mole) in anhydrous benzene (100 ml.). The mixture is stirred and refluxed for one-half hour, and then allowed to cool to room temperature. The solid is filtered and washed with water (2× 150 ml.), giving a light yellow solid (7.8 g.), M.P. 162–185° C. (uncorr.). The crude solid is recrystallized from benzene, giving white crystals of 6-chloro-2-[methyl(2-pyridylmethyl)amino]-4H-1,3-benzothiazin-4-one (6.2 g. 65 percent), M.P. 175–177° C. (uncorr.).

*Analysis.*—Calcd. for $C_{15}H_{12}ClN_3OS$: C, 56.69; H, 3.80; N, 13.23. Found: C, 57.16; H, 3.82; N, 13.23.

Similarly, reacting ethyl 2-pyridylethyl amine with 2,6-dichloro-4H-1,3-benzothiazin-4-one, there is obtained 6-chloro-2-[ethyl(2-pyridylethyl)amino]-4H-1,3-benzothiazin-4-one.

EXAMPLE VI

A mixture of methyl 2-mercaptobenzoate (17.0 g.), N-cyanopyrrolidine (11.0 g.) and p-toluenesulfonic acid monohydrate (0.4 g.) is heated with stirring in a nitrogen stream to 175° C. over a period of two and one-half hours. Vacuum is applied to remove unreacted materials and the residue dissolved in methylene chloride, extracted with concentrated hydrochloric acid (2× 100 ml.). The combined acidic extracts are washed with methylene chloride, then cooled in an ice bath, and basified with concentrated ammonium hydroxide in the presence of methylene chloride (200 ml.). The organic layer is separated, and the aqueous layer extracted with methylene chloride (150 ml.). The combined organic extracts are successively washed with water (150 ml.), saturated sodium chloride solution (150 ml.) and filtered through anhydrous sodium sulfate. The solvent is distilled in vacuo and cooled to afford 2-(1-pyrrolidinyl)-4H-1,3-benzothiazin-4-one which is recrystallized from ethanol, M.P. 207.5–210° C.

*Analysis.*—Calcd. for $C_{12}H_{12}N_2OS$: C, 62.04; H, 5.20; N, 12.06. Found: C, 62.14; H, 5.23; N, 12.31.

In a similar manner, methyl 5-chloro-2-mercaptobenzoate and N-cyanopyrrolidine are reacted to afford 6-chloro-2-(1-pyrrolidinyl)-4H-1,3-benzothiazin-4-one, M.P. 248.5–249° C.

*Analysis.*—Calcd. for $C_{12}H_{11}ClN_2OS$: C, 54.03; H, 4.15; N, 10.50. Found: C, 53.83; H, 4.10; N, 10.08.

The above procedure is again repeated to afford 8-nitro-2-(1-pyrrolidinyl)-4H-1,3-benzothiazin-4-one and 2-(1-pyrrolidinyl)-6-sulfamoyl-4H-1,3-benzothiazin-4-one.

EXAMPLE VII

A mixture of methyl 2-mercaptobenzoate (8.0 g.), N-methyl-N-phenylcyanamide (5.5 g.) and p-toluenesulfonic acid monohydrate (0.2 g.) is heated with stirring in a nitrogen stream to 175° C. over a period of two and one-half hours. Vacuum is applied to remove unreacted materials and the residue dissolved in methylene chloride, extracted with concentrated hydrochloric acid (2× 50 ml.). The combined acidic extracts are washed with methylene chloride, then cooled in an ice bath, and basified with concentrated ammonium hydroxide in the presence of methylene chloride (100 ml.). The organic layer is separated, and the aqueous layer extracted with methylene chloride (75 ml.). The combined organic extracts are successively washed with water (75 ml.), saturated sodium chloride solution (150 ml.) and filtered through anhydrous sodium sulfate. The solvent is distilled in vacuo and the residual oil cooled. The resulting solid is recrystallized from benzene/cyclohexane to afford 2-(N-methylanilino)-4H-1,3-benzothiazin-4-one, M.P. 145–147.5° C.

*Analysis.*—Calcd. for $C_{15}H_{12}N_2OS$: C, 67.13; H, 4.51; N, 10.44. Found: C, 67.05; H, 4.46; N, 10.29.

Similarly, methyl 4-chloro-2-mercaptobenzoate is reacted with N-methyl-N-phenylcyanamide to afford 7-chloro-2-(N-methylanilino)-4H-1,3-benzothiazin-4-one, M.P. 159–160° C.

*Analysis.*—Calcd. for $C_{15}H_{11}ClN_2OS$: C, 59.50; H, 3.66; N, 9.26. Found: C, 59.13; H, 3.61; N, 9.41.

In the same manner, the following compounds are prepared:

7-chloro-2-(N-4-dimethylanilino)-4H-1,3-benzothiazin-4-one;

6-chloro-2-(4-chloro-N-methylanilino)-4H-1,3-benzothiazin-4-one;

7-diethylamino-2-(N-ethyl-4-fluoroanilino)-4H-1,3-benzothiazin-4-one;

7-dimethylamino-2-(N-methylanilino)-4H-1,3-benzothiazin-4-one;

2-(4-bromo-N-methylanilino)-6-ethylthio-4H-1,3-benzothiazin-4-one.

EXAMPLE VIII

Repeating the procedure of Examples VI and VII, to react the hereinafter listed mercaptobenzoates and cyano compounds the following benzothiazinones are obtained:

| Starting Materials | Products |
|---|---|
| Methyl 2-mercaptobenzoate and N-cyanomorpholine. | 2-morpholino-4H-1,3-benzothiazin-4-one, M.P. 176–178° C. |
| Methyl 5-chloro-2-mercaptobenzoate and dimethylcyanamide. | 6-chloro-2-dimethylamino-4H-1,3-benzothiazine-4-one, M.P. 200–201° C. |
| Methyl 5-chloro-2-mercaptobenzoate and N-cyanopiperidine. | 6-chloro-2-piperidino-4H-1,3-benzothiazin-4-one. M.P. 172–173.5° C. |
| Methyl 5-chloro-2-mercaptobenzoate and N-methyl-N-phenylcyanamide. | 6-chloro-2-(N-methylanilino)-4H-1,3-benzothiazin-4-one, M.P. 186.5–188.5° C. |
| Methyl 4-chloro-2-mercaptobenzoate and dimethylcyanamide. | 7-chloro-2-dimethylamino-4H-1,3-benzothiazin-4-one, M.P. 191–192° C. |
| Methyl 4-chloro-2-mercaptobenzoate and diethylcyanamide. | 7-chloro-2-diethylamino-4H-1,3-benzothiazine-4-one, M.P. 111–113° C. |

EXAMPLE IX

A solution of sarcosine (7.5 g., 0.06 mole) in anhydrous dimethylformamide (25 ml.), is added to a boiling mixture of 2-chloro-4H-1,3-benzothiazin-4-one (7.0 g.) in anhydrous dimethylformamide (100 ml.). The mixture is stirred and refluxed for one-half hour and then allowed to cool to room temperature. The solid is filtered and washed with water (2× 150 ml.), giving a solid which is recrystallized from dimethylforamide to give N-(4-oxo-4-H-1,3-benzothiazin-2-yl)sarcosine, M.P. 242–243° C. (dec.).

In the same manner, 2,6-dichloro-4H-1,3-benzothiazin-4-one and β-alanine are reacted to afford N-(6-chloro-4-oxo-4H-1,3-benzothiazin-2-yl)-β-alanine, M.P. 246.5–247.5° C. (dec.).

EXAMPLE X

A solution of N-aminohomopiperidine (0.06 mole) in anhydrous benzene (25 ml.), is added to a boiling mixture of 2,6-dichloro-4H-1,3-benzothiazin-4-one (0.03 mole) in anhydrous benzene (100 ml.). The mixture is stirred and refluxed for one hour and then allowed to cool to room temperature. The solid is filtered and washed with water (2× 150 ml.), giving a solid which is recrystallized from ethanol to afford 6-chloro-2-(hexahydroazepin-1-yl-amino)-4H-1,3-benzothiazin-4-one, M.P. 252–255° C. (dec.).

*Analysis.*—Calcd. for $C_{14}H_{16}ClN_3OS$: C, 54.27; H, 5.20; N, 13.57. Found: C, 54.27; H, 5.14; N. 13.87.

Similarly, by reacting 2,6-dichloro-4H-1,3-benzothiazin-4-one with N-(m-methoxyphenyl)piperazine there is obtained 6-chloro-2-[4-m-methoxyphenyl)-1-piperazinyl]-4H-1,3-benzothiazin-4-one, M.P. 145–147° C.

*Analysis.*—Calcd. for $C_{19}H_{18}ClN_3O_2S$: C, 58.83; H, 4.68; N, 10.83. Found: C, 59.17; H, 4.54; N, 10.37.

EXAMPLE XI

A mixture of methyl 2-mercaptobenzoate (0.1 m.), N-cyano-N'-methylpiperazine (0.11 m.) and sodium methoxide (0.4 g.) is heated with stirring in a nitrogen stream to 175° over a period of two hours. Vacuum is applied to remove unreacted materials and the residue dissolved in methylene chloride, extracted with concentrated hydrochloric acid (2× 100 ml.). The combined acidic extracts are washed with methylene chloride, then cooled in an ice bath, and basified with concentrated ammonium hydroxide in the presence of methylene chloride (200 ml.) The organic layer is separated, and the aqueous layer extracted with methylene chloride (150 ml.). The combined organic extracts are successively washed with water (150 ml.), saturated sodium chloride solution (150 ml.) and filtered through anhydrous sodium sulfate. The solvent is distilled in vacuo and cooled. The resulting precipitate is recrystallized from benzene-cyclohexane to afford 2-(4-methyl-1-piperazinyl)-4H-1,3-benzothiazin-4-one, M.P. 142–144° C.

*Analysis.*—Calcd. for $C_{13}H_{15}N_3OS$: C, 59.74; H, 5.78; N, 16.08. Found: C, 59.70; H, 5.66; N, 16.12.

Similarly, 2-(4-propyl-1-piperazinyl)-4H-1,3-benzothiazin-4-one is prepared.

EXAMPLE XII

A mixture of methyl 5-chloro-2-mercaptobenzoate (0.1 m.), N-cyano-N'-methylpiperazine (0.11 m.) and sodium ethoxide (0.4 g.) is heated with stirring in a nitrogen stream to 175° C. over a period of two and one-half hours. Vacuum is applied to remove unreacted materials and the residue dissolved in methylene chloride, extracted with concentrated hydrochloric acid (2× 100 ml.). The combined acidic extracts are washed with methylene chloride, then cooled in an ice bath, and basified with concentrated ammonium hydroxide in the presence of methylene chloride (200 ml.). The organic layer is separated, and the aqueous layer extracted with methylene chloride (150 ml.). The combined organic extracts are successively washed with water (150 ml.), saturated sodium chloride solution (150 ml.) and filtered through anhydrous sodium sulfate. The solvent is distilled in vacuo and cooled. The precipitate is recrystallized from benzene-cyclohexane to afford 6-chloro-2-(4-methyl-1-piperazinyl)-4H-1,3-benzothiazin-4-one, M.P. 137–139° C.

*Analysis.*—Calcd. for $C_{13}H_{14}ClN_3OS$: C, 52.79; H, 4.77; N, 14.21. Found: C, 52.78; H, 4.20; N. 14.02.

EXAMPLE XIII

A mixture of methyl 5-chloro-2-mercaptobenzoate (0.06 mole). diethylcyanamide (0.069 mole), and p-toluenesulfonic acid monohydrate (0.2 g.) is stirred under a slow stream of nitrogen while increasing its temperature from 100° C. to 150° C. over one-half hour. The temperature is then kept at 150° C. for two hours and then brought to room temperature. The residue is triturated with ethyl acetate and filtered, giving a solid which is recrystallized from benzenecyclohexane to afford 6-chloro-2-diethylamino-4H-1,3-benzothiazin-4-one, M.P. 108–110° C.

*Analysis.*—Calcd. for $C_{12}H_{13}ClN_2OS$: C, 53.63; H, 4.87; N, 10.42. Found: C, 53.54; H, 4.93; N, 10.54.

Similarly, the following products are obtained:

8-chloro-2-dimethylamino-4H-1,3-benzothiazin-4-one, M.P. 178–179.5° C.

*Analysis.*—Calcd. for $C_{10}H_9ClN_2OS$: C, 49.89; H, 3.77; N, 11.63. Found: C, 49.81; H, 3.55; N, 11.69.

8-chloro-2-diethylamino-4H-1,3-benzothiazin-4-one, M.P. 140–141.5° C.

*Analysis.*—Calcd. for $C_{12}H_{13}ClN_2OS$: C, 53.63; H, 4.87; N, 10.42. Found: C, 53.34; H, 5.18; N, 10.20.

EXAMPLE XIV

A mixture of methyl 5-chloro-2-mercaptobenzoate (0.12 mole), n-butyl-N-cyanosarcosine (0.12 mole), and sodium methoxide (0.2 g.) is stirred under a slow stream of nitrogen while increasing its temperature from 100° C. to 150° C. over one hour. The temperature is then kept at 150° C. for three hours and then brought to room temperature. The residue is triturated with ethyl acetate and filtered, giving a solid which is recrystallized from benzene-ethyl acetate to yield 6-(6-chloro-4-oxo-4H-1,3-benzothiazin-2-yl)sarcosine, n-butyl ester, M.P. 140–141° C.

*Analysis.*—Calcd. for $C_{15}H_{17}ClN_2O_3$: C, 52.86; H, 503; N, 8.22. Found: C, 53.29; H, 5.32; N, 8.21.

In the same manner, the following products are obtained:

N-(4-oxo-4H-1,3-benzothiazin-2-yl)sarcosine, n-butyl ester, M.P. 76–78° C.

*Analysis.*—Calcd. for $C_{15}H_{18}N_2O_3S$: C, 58.80; H, 5.92; N, 9.15. Found: C, 58.82; H, 5.66; N, 9.08.

6-chloro-2-morpholino-4H-1,3-benzothiazin-4-one, M.P. 219–221° C.

*Analysis.*—Calcd. for $C_{12}H_{11}ClN_2O_2S$: C, 50.97; H, 3.92; N, 9.91. Found: C. 50.80; H, 3.55; N, 10.14.

7-chloro-2-(1-pyrrolidinyl)-4H-1,3-benzithiazin-4-one, M.P. 224–226° C.

*Analysis.*—Calcd. for $C_{12}H_{11}ClN_2OS$: C, 54.03; H, 4.15; N, 10.50. Found: C, 53.98; H, 3.98; N, 10.87.

7-chloro-2-piperidino-4H-1,3-benzothiazin-4-one, M.P. 182–184° C.

*Analysis.*—Calcd. for $C_{13}H_{13}ClN_2OS$: C, 55.60; H, 4.66; N, 9.98. Found: C, 55.96; H, 4.59; N, 9.91.

EXAMPLE XV

A mixture of methyl 4-bromo-2-mercaptobenzoate (0.1 m.), diethylcyanamide (0.11 m.) and p-toluenesulfonic acid monohydrate (0.4 g.) is heated with stirring in a nitrogen stream to 175° C. over a period of two hours. Vacuume is applied to remove unreacted materials and the residue dissolved in methylene chloride, extracted with concentrated hydrochloric acid (2×100 ml.). The combined acidic extracts are washed with methylene chloride, then cooled in an ice bath, and basified with concentrated ammonium hydroxide in the presence of methylene chloride (200 ml.). The organic layer is separated, and the aqueous layer extracted with methylene chloride (150 ml.). The combined organic extracts are successively washed with water (150 ml.), saturated sodium chloride solution (150 ml.) and filtered through anhydrous sodium sulfate. The solvent is distilled in vacuo affording an oil which crystallizes on cooling and scratching. The crude product is recrystallized from ether to yield 7-bromo-2-diethylamino-4H-1,3-benzothiazin-4-one.

Employing the above procedure, the following compounds are produced:

2-(4-ethoxyphenyl-1-piperazinyl)-6-trifluoromethyl-4H-1,3-benzothiazin-4-one;
2-(2-hydroxyethylamino)-6-(4-ethoxyphenyl)-4H-1,3-benzothiazin-4-one;
2-dimethylamino-7-(2-pyridyl)-4H-1,3-benzothiazin-4-one;
6-benzyl-2-diethylamino-4H-1,3-benzothiazin-4-one;
2-dimethylamino-4-oxo-7-(4H-1,3-benzothiazinyl) carboxylic acid; and
2-diethylamino-4-oxo-7-(4H-1,3-benzothiazinyl) carboxylic acid, ethyl ester.

What is claimed is:
1. A compound selected from the group consisting of those having the formula:

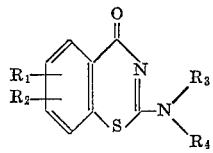

wherein $R_1$ is selected from the group consisting of hydrogen, lower alkyl, lower alkoxy, lower alkoxyphenyl, benzyl, pyridyl, trifluoromethyl, halogen, nitro, amino, di(lower) alkylamino, carbamoyl, sulfamoyl, lower alkoxycarbonyl, lower alkylthio and carboxy(lower) alkyl; $R_2$ is selected from the group consisting of hydrogen, lower alkyl, lower alkoxy and halogen; $R_3$ is selected from the group consisting of hydrogen, lower alkyl, hydroxy(lower)alkyl, phenyl, lower alkylphenyl, halophenyl, carboxy(lower)alkyl, and lower alkoxycarbonylmethyl; $R_4$ is selected from the group consisting of hydrogen and lower alkyl with the proviso that when $R_4$ is hydrogen $R_3$ is other than hydrogen; and when $R_3$ and $R_4$ are taken together with the nitrogen atom to which they are attached they form a ring selected from the group consisting of morpholino, piperidino, pyrrolidino, 4-(lower) alkylpiperazino, 4-(lower)alkoxyphenyl-1-piperazino, hexahydroazepinylamino and pyridyl(lower)alkyl.

2. A compound as described in claim 1 which is: 2-dimethylamino-4H-1,3-benzothiazin-4-one.
3. A compound as described in claim 1 which is: 2-diethylamino-4H-1,3-benzothiazin-4-one.
4. A compound as described in claim 1 which is: 2-diisopropylamino-4H-1,3-benzothiazin-4-one.
5. A compound as described in claim 1 which is: 2-(1-piperidino)-4H-1,3-benzothiazin-4-one.
6. A compound as described in claim 1 which is: 6-chloro-2-[methyl(2-pyridylmethyl)amino]-4H-1,3-benzothiazin-4-one.
7. A compound as described in claim 1 which is: 2-(1-pyrrolindinyl)-4H-1,3-benzothiazin-4-one.
8. A compound as described in claim 1 which is: 6-chloro-2-(1-pyrrolidinyl)-4H-1,3-benzothiazin-4-one.
9. A compound as described in claim 1 which is: 2-(N-methylanilino)-4H-1,3-benzothiazin-4-one.
10. A compound as described in claim 1 which is: 2-morpholino-4H-1,3-benzothiazin-4-one.
11. A compound as described in claim 1 which is: 2-(4-methyl-1-piperazinyl)-4H-1,3-benzothiazin-4-one.
12. A compound as described in claim 1 which is: 6-chloro-2-dimethylamino-4H-1,3-benzothiazin-4-one.
13. A compound as described in claim 1 which is: 6-chloro-2-diethylamino-4H-1,3-benzothiazin-4-one.
14. A compound as described in claim 1 which is 6-chloro-2-piperidino-4H-1,3-benzothiazin-4-one.
15. A compound as described in claim 1 which is: 6-chloro-2-(4-methyl-1-piperazinyl)-4H-1,3-benzothiazin-4-one.
16. A compound as described in claim 1 which is: N-(6-chloro-4-oxo-4H-1,3-benzothiazin-2-yl)sarcosine, n-butyl ester.
17. A compound as described in claim 1 which is: 6-chloro-2-(N-methylanilino)-4H-1,3-benzothiazin-4-one.
18. A compound as described in claim 1 which is: N-(4-oxo-4H-1,3-benzothiazin-2-yl-sarcosine, n-butyl ester.
19. A compound as described in claim 1 which is: 6-chloro-2-morpholino-4H-1,3-benzothiazin-4-one.
20. A compound as described in claim 1 which is: 7-chloro-2-dimethylamino-4H-1,3-benzothiazin-4-one.
21. A compound as described in claim 1 which is: 7-chloro-2-(1-pyrrolidinyl)-4H-1,3-benzothiazin-4-one.
22. A compound as described in claim 1 which is: 7-chloro-2-diethylamino-4H-1,3-benzothiazin-4-one.
23. A compound as described in claim 1 which is: 7-chloro-2-piperidino-4H-1,3-benzothiazin-4-one.
24. A compound as described in claim 1 which is: 7-chloro-2-(N-methylanilino)-4H-1,3-benzothiazin-4-one.
25. A compound as described in claim 1 which is: 8-chloro-2-dimethylamino-4H-1,3-benzothiazin-4-one.
26. A compound as described in claim 1 which is: 8-chloro-2-diethylamino-4H-1,3-benzothiazin-4-one.
27. A compound as described in claim 1 which is: N-(4-oxo-4H-1,3-benzothiazin-2-yl)sarcosine.
28. A compound as described in claim 1 which is: 6-chloro-2-(hexahydroazepin-1-yl-amino)-4H-1,3-benzothiazin-4-one.
29. A compound as described in claim 1 which is: 6-chloro-2-[4-(3-methoxyphenyl)-1-piperazinyl]-4H-1,3-benzothiazin-4-one.
30. A compound as described in claim 1 which is: N-(6-chloro-4-oxo-4H-1,3-benzothiazin-2-yl)-β-alanine.

References Cited
UNITED STATES PATENTS
3,149,106  9/1964  Loev _____ 260—243

OTHER REFERENCES
Grigat et al.: Chemische Berichte, pp. 3036–44, vol. 97 (1964).

HENRY R. JILES, Primary Examiner
JOHN M. FORD, Assistant Examiner

U.S. Cl. X.R.
260—999

UNITED STATES PATENT OFFICE
Certificate

Patent No. 3,470,168                                                                     Patented September 30, 1969

Milton Wolf and John H. Sellstedt

Application having been made by Milton Wolf and John H. Sellstedt, the inventors named in the patent above identified, and American Home Products Corporation, New York, N.Y., a corporation of Delaware, the assignee, for the issuance of a certificate under the provisions of Title 35, Section 256, of the United States Code, deleting the name of John H. Sellstedt as a joint inventor, and a showing and proof of facts satisfying the requirements of the said section having been submitted, it is this 15th day of September 1970, certified that the name of the said John H. Sellstedt is hereby deleted from the said patent as a joint inventor with the said Milton Wolf.

FRED W. SHERLING
*Associate Solicitor.*